US008122381B2

(12) United States Patent
Vignet

(10) Patent No.: US 8,122,381 B2
(45) Date of Patent: Feb. 21, 2012

(54) CONTEXT DEBUGGER

(75) Inventor: Peter Vignet, San Francisco, CA (US)

(73) Assignee: SAP AG, Walldorf (DE)

( * ) Notice: Subject to any disclaimer, the term of this patent is extended or adjusted under 35 U.S.C. 154(b) by 1069 days.

(21) Appl. No.: 11/242,289

(22) Filed: Oct. 3, 2005

(65) Prior Publication Data
US 2007/0079257 A1 Apr. 5, 2007

(51) Int. Cl.
*G06F 3/048* (2006.01)
(52) U.S. Cl. .......................... 715/853; 715/713
(58) Field of Classification Search .................. 715/853, 715/713, 854
See application file for complete search history.

(56) References Cited

U.S. PATENT DOCUMENTS

| | | | |
|---|---|---|---|
| 6,222,559 B1 * | 4/2001 | Asano et al. | 345/440 |
| 6,434,564 B2 * | 8/2002 | Ebert | 707/100 |
| 7,054,870 B2 * | 5/2006 | Holbrook | 707/10 |
| 7,069,537 B2 * | 6/2006 | Lazarov | 717/104 |
| 7,191,189 B2 * | 3/2007 | Bhatti | 707/103 R |
| 7,353,464 B1 * | 4/2008 | Kundu et al. | 715/853 |
| 2003/0163479 A1 * | 8/2003 | Mathews et al. | 707/102 |
| 2004/0064802 A1 * | 4/2004 | Cherdron et al. | 717/100 |
| 2005/0027797 A1 * | 2/2005 | San Andres et al. | 709/203 |

OTHER PUBLICATIONS

Woods et al. "SAP Netweaver for Dummies". May 2004. Wiley Publishing, Inc. Available at: http://searchsap.techtarget.com/searchSAP/downloads/SAPNetWeaver_forDummiesCh03.pdf.*

* cited by examiner

*Primary Examiner* — Omar Abdul-Ali
(74) *Attorney, Agent, or Firm* — Buckley, Maschoff & Talwalkar LLC

(57) ABSTRACT

Methods and apparatus, including computer program products, for user a context debugger. A computer-implemented method of displaying information on a computer display device includes loading data into a context hierarchical data structure into memory during an execution of a business software application, the context hierarchical data structure comprising an arrangement of nodes and attributes, and displaying a first view on the display device during the execution, the first view comprising the context hierarchical data structure and data.

20 Claims, 4 Drawing Sheets

200

Load data into context
hierarchical data structure
202

Display first view
204

Determine whether data
structure is correct
206

Determine whether dynamic
nodes & attributes are created
208

Determine whether dynamic nodes
& attributes contain data
210

CONTEXT DEBUGGER

BACKGROUND

The present invention relates to data processing by digital computer, and more particularly to a context debugger.

SAP Web Dynpro from SAP AG is an integral part of a SAP Web Application that provides a design-time environment that is independent of the underlying run time environment and enables companies to model and design user interfaces (UIs) cost-effectively and precisely. A Web Dynpro application includes a set of views, navigation between the views, concepts for managing the views and determining their sequence, a context for keeping session data, and the business logic of the application.

Web Dynpro is built on a concept of a Model View Controller (MVC). The MVC paradigm allows for a strict separation of presentation logic, business logic, navigation, and eventing. MVC is the design pattern for efficiently relating a UI to underlying data models. The MVC pattern is used in program development with programming languages such as Java, Smalltalk, C, and C++.

SUMMARY

The present invention provides methods and apparatus, including computer program products, for a context debugger.

In general, in one aspect, the invention features a computer-implemented method of displaying information on a computer display device includes loading data into a context hierarchical data structure in memory during an execution of a business software application, the context hierarchical data structure including an arrangement of nodes and attributes, and displaying a first view on the display device during the execution, the first view including the context hierarchical data structure and data.

In embodiments, the method can include determining whether the context hierarchical data structure is correct, determining whether dynamic nodes and attributes have been created, and determining whether the dynamic nodes and attributes contain data.

The context hierarchical data structure can represent a controller that interprets and monitors data input by a user that causes a model or a view to change if necessary. The model can represent an application object of the business software application. The view can include a set of user interface (UI) elements that can display application data and receive input, the UI elements bound to the context hierarchical data structure.

The first view can include features selected from the group including horizontal reading, vertical reading, limited reading or on and off options.

The view and the controller can form a user interface (UI).

In another aspect, the invention features a graphical user interface (GUI) including a context hierarchical data structure and data representing controller that interprets and monitors data input by a user that causes a model or a view to change, the model representing an application object of a business software application, the view including a set of user interface (UI) elements that can display application data and receive input, the UI elements bound to the context hierarchical data structure.

In embodiments, the GUI can include features selected from the group including a horizontal reading pane, a vertical reading pane, a limited reading pane and an on/off options pane.

The invention can be implemented to realize one or more of the following advantages.

A context debugger reads a context hierarchy date structure stored in memory and data at run time and displays them. Using the context debugger, a developer can find out if the data structure is correct, if the dynamic nodes and attributes have been created, if the nodes and attributes have data and if the mapped models have been populated.

Context Debugger enables the developer to read and show at run time the structure of a context and its data. It is a debugging tool for a developer. It is easy to implement, activate and use.

One implementation of the invention provides all of the above advantages.

Other features and advantages of the invention are apparent from the following description, and from the claims.

BRIEF DESCRIPTION OF THE DRAWINGS

FIG. 4 is flow diagram.
Like reference numbers and designations in the various drawings indicate like

DETAILED DESCRIPTION

Figure 1:
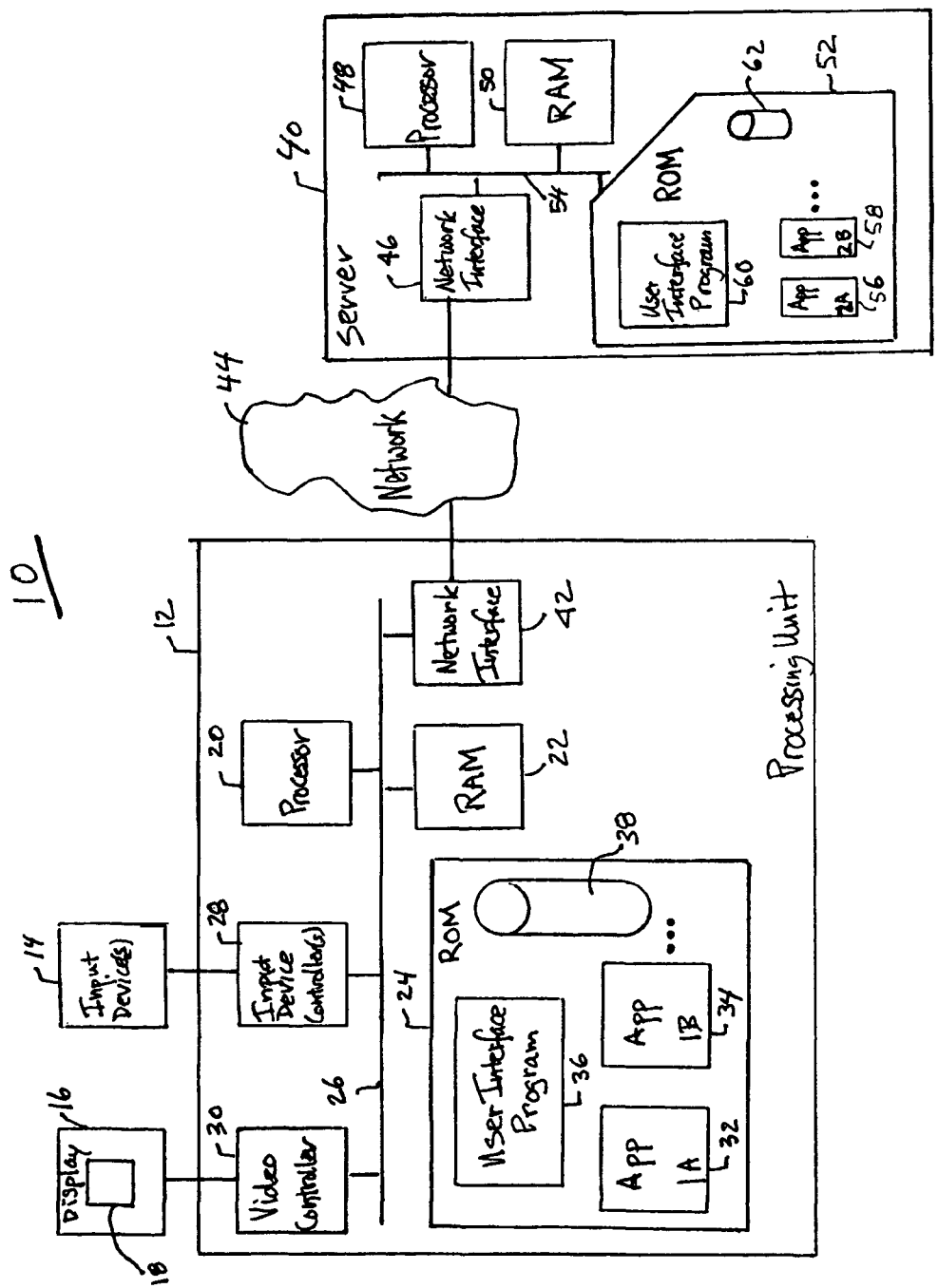
FIG. 1 is a block diagram of an exemplary system.

As shown in FIG. 1, an exemplary computer system 10 includes a processing unit 12, one or more input devices 14, and a display device 16, upon which a user is presented displays. The display device 16 has a video screen 18 upon which displays appear.

The processing unit 12 can include a processor 20, random access memory (RAM) 22, and read-only memory (ROM) 24, all interconnected by a data bus 26. Input device controllers 28, also connected to the data bus 26, receive command signals from input devices 14 and forward the command signals in the appropriate format for processing. A video controller 30, connected to the data bus 26, receives video command signals from the data bus 26 and generates the appropriate video signals that are forwarded to the display device 16 so that the desired display is provided on the screen 18. The system 10 is not limited to a personal computer (PC), but could include a personal digital assistant (PDA), a terminal, a workstation, or other such device.

ROM 24 provides non-volatile data storage for various application programs. In the example shown, a number of different application programs 32, 34, are stored in ROM 24. Also stored in ROM 24 is a user interface (UI) program 36 designed to work in concert with each of the application programs 32, 34. This is conceptually depicted by the UI program 36 shown as a layer on top of the application programs 32, 34. With such a design, UI program modules common to several application programs need not be duplicated in each of the application programs 32, 34. In addition, such a design may enable a common "look-and-feel" to the UI for the different program applications 32, 34. In other examples, the UI program, or module, is not a common program or module for more than one program application. In still other examples, the components described can be combined or separated in various manners, and can be stored in various manners, such as on various non-volatile storage medium.

Programs 32, 34, 36 have program instructions that can be loaded into RAM 22 during operation. Processor 20 then executes the program instructions, as required, to perform desired program functions.

Also stored in ROM 24 are various data in database 38. Database 38 includes data needed or generated during operation of the application programs 32, 34. Although only a single database 38 is shown that serves as a common database for all applications 32, 34, in other examples there can be separate databases for one, or more, of the applications 32, 34.

System 10 includes connection to a server 40 and a network interface 42, connected to its data bus 26. As such, system 10 can access server 40 over network 44 to run applications residing on the server 40. Network 44 can be, for example, a Local Area Network (LAN), Wide Area Network (WAN), or the Internet.

The server 40 includes a network interface 46, a processor 48, RAM 50, and ROM 52, all interconnected by a data bus 54. The server's network interface 46 provides the connection to network 44 so that client computer systems, such as system 10, can access the server 40. In similar fashion to computer system 10, the server ROM 52 includes various different application programs 56, 58, as well as a common user interface program 60 for the application programs 56, 58. ROM 52, in this example, includes data stored in database 62, although in other implementations separate databases or a separate database server may be required.

Figure 2:
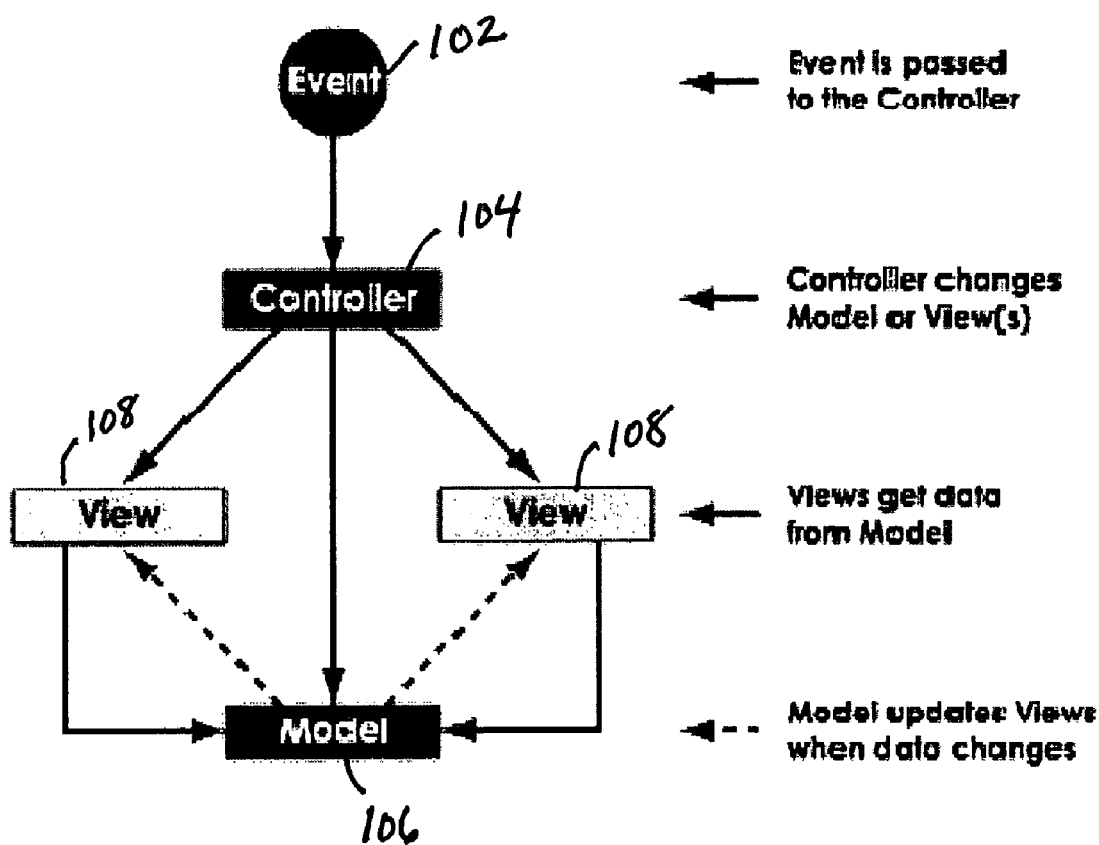
FIG. 2 is a block diagram of an abstraction of a Model View Controller (MVC).

As shown in FIG. 2, an abstraction of a Model View Controller (MVC) 100 is a classic design pattern often used by applications that need an ability to maintain multiple views of the same data. The MVC pattern 100 hinges on a clean separation of objects into one of three categories, i.e., models for maintaining data, views for displaying all or a portion of the data, and controllers for handling events that affect the model or view(s). Because of this separation, multiple views and controllers can interface with the same model. Even new types of views and controllers that never existed before can interface with a model without forcing a change in the model design.

Events 102 typically cause a controller 104 to change a model 106, or view 108, or both. Whenever the controller 104 changes a model's data or properties, all dependent views are automatically updated. Similarly, whenever the controller 104 changes a view 108, for example, by revealing areas that were previously hidden, the view 108 gets data from the underlying model 106 to refresh itself.

As described above, SAP Web Dynpro is designed on the concept of a MVC. A model is any layer of software code that encapsulates some business functionality external to a SAP Web Dynpro component. The model provides access to functionality such as Business Application Programming Interface (BAPI) calls or Web Services, and can be implemented, for example, as a set of proxy objects or Enterprise JavaBeans (EJB).

The controller acts as a binding layer between the model and the view layers. The controller has a context. A context is one hierarchical data storage structure for the controller. A context includes hierarchical arrangements of entities known as nodes and attributes. A node can be a value node or model node. A value node holds the data itself, whereas a model node holds a reference to an external (model) object storing the data. A node is permitted to have children, an attribute is not. A node represents a collection. Each node has a collection of elements. Each element has a set of attributes. Each attribute element holds data. Nodes and attributes can be created at design time or at run time.

A view includes a set of user interface (UI) elements than can both display application data and receive input. UI elements are bound to a context that contains the data relevant in the view.

The context maintains and manages the data models and other data using the nodes, attributes and elements. The context is an important component to represent data in a view. If the context is empty, no data will be shown.

Contexts receive data from a back end system, keep the data and manage the data. Contexts are also used to show data in the views. Nodes and attributes might be created at run time. Data are populated at run time. When creating a Web Dynpro application and debugging the application, it is important to verify the data contexts. For example, a developer may want to see if the View controller context has data, or if the back end model has been populated or if the supply function has been kicked off as designed. Moreover, if the developer has designed a dynamic context that also builds nodes and attributes at run time, the developer may want to verify if the dynamic nodes and attributes have been created and then populated.

SAP IWDNode is an application interface implemented by context nodes. While this class is used when programming dynamically, more conveniently, typed subinterfaces of this interface are generated for context nodes whose structure is declared within Web Dynpro. The SAP IWDNodeInfo interface represents the static structural aspect of a Node and its Node Elements at run time keeping the metadata as defined at design time. Each Node has a reference to a Node Info holding its metadata. SAP IWDContext, IWDnode, and IWDNodeInfo do not offer a ready to use method to describe the structure of a context or read a context a run time. IWDContext is a public interface that enables access to the context data of a controller. All data managed by a controller is contained in its context. Contexts are structured as a tree of nodes which in turn contain attributes. The context interface provides access to the root node, to the metadata of the root node and to the type info for a context attribute. For contexts created with Web Dynpro design time tools, sub interfaces are generated that provide typed access to the subnodes of the context root node.

Figure 3:
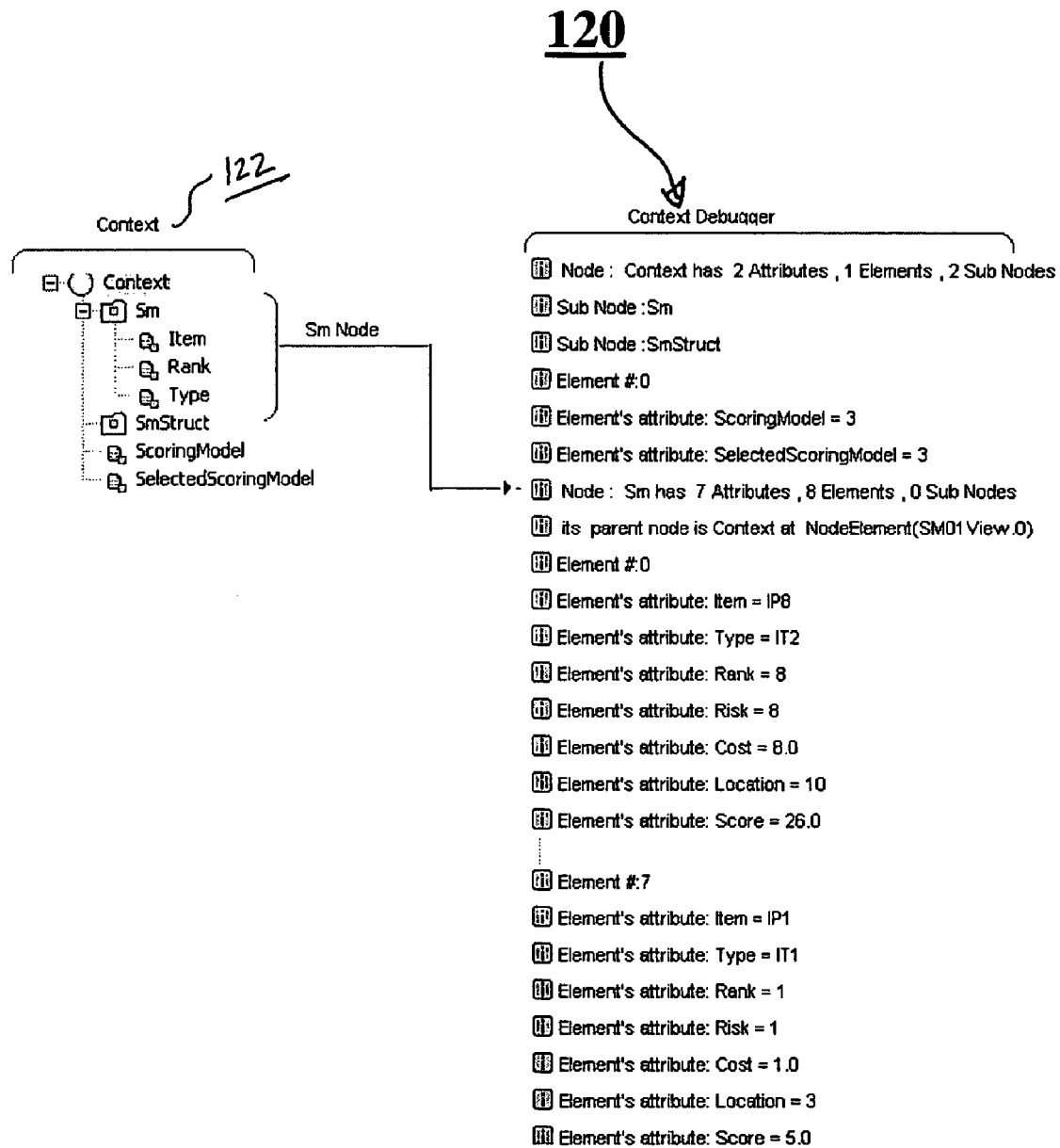
FIG. 3 is a block diagram of a display.

As shown in FIG. 3, a context debugger 120 reads a context hierarchy 122 and data at run time and displays them. From the displayed context hierarchy 122, a developer can determine whether the structure is correct, if the dynamic nodes and attributes have been created, if the nodes and attributes have data and if the mapped models have been populated. The context debugger 120 can be implemented, for example, as a Development Component (DC), a set of Java® classes, methods added to the SAP IWDContext class, and so forth. A DC contains one or more running applications. A DC is a frame shared by a number of objects, which are part of the software. A DC presents a well-defined interface to the outside world, while its internal life remains invisible. DCs can use one another by referring to the public interfaces of other components. Due to these characteristics, DCs can form the basic reusable units of the model.

The context debugger 120 can include options or functions, such as, for example, horizontal or vertical reading. Horizontal reading means starting from the root node and then reading all attributes and nodes under it; then reading all nodes and attributes under each of these nodes and so on. Vertical reading means reading the attributes and the first node under the root node, then drilling down with the same logic from the first node and so on until the last leaf; once the first node and all its attributes and sub nodes are read, restart with the second node and so on for all the nodes under the root nodes. The context debugger 120 can be limited to reading the context for some specific nodes, or some specific attributes or some specific elements. The context debugger 120 can include on and off options.

In the example shown, the context hierarchy 122 illustrates that the Root node or Context has two attributes, i.e., "Scoring Model" and "SelectedScoring Model;" one node "Sm" having three static attributes "Item," "Rank," "Type," and one node "SmStructure" with no attributes. The context debugger 120 shows the value of the "Scoring Model"=3 and "SelectedScoring Model"=3,the node "Sm" with the three static attributes and with four other dynamic attributes (i.e., Risk, Cost, Location, Score), and the "Sm" node having eight elements and the values of the attributes of each element. Dynamic attributes and dynamic nodes are built dynamically at run time so their existence and their contents can only be verified and read during run time.

The context debugger 120 shows the structure and the data of each node, even if the node is empty. The context debugger 120 gives, for each node, a summary of its structure and data (numbers of attributes, elements, sub nodes). The context debugger 120 lists attribute names and sub node names of the node. If a node is a dependent node, context debugger 120 shows its parent node element. If the node has elements, context debugger 120 shows, for each element, the values of the attributes of the elements.

Figure 4:
Figure 4:
Figure 4:
Figure 4:

As shown in FIG. 4, a context debugging process 200 includes loading (202) data into a context hierarchical data structure in memory during an execution of a business software application, the context hierarchical data structure including an arrangement of nodes and attributes. Process 200 displays (204) a first view on the display device during the execution, the first view comprising the context hierarchical data structure and data.

Process 200 determines (206) whether the context hierarchical data structure is correct, determines (208) whether dynamic nodes and attributes have been created, and determines (210) whether the dynamic nodes and attributes contain data.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A computer-implemented method of displaying information on a computer display device, the method comprising:
   loading data into a context hierarchical data structure in memory during an execution of a business software application, the context hierarchical data structure comprising an arrangement of nodes and attributes, wherein the data are generated during execution and debugging of software;
   retrieving at least a portion of the data from the context hierarchical data structure;
   generating a summary of the structure and data of each node in the context hierarchical data structure wherein at least one of the nodes is a model node, the model node including a reference to an external object storing data, the summary including:
      for each node in the context hierarchical data structure, a number of attributes associated with the node, a number of elements associated with the node, and a number of sub nodes associated with the node;
      for each element in the context hierarchical data structure, a list of attributes associated with the element; and
      for each attribute in the context hierarchical data structure, a value of the attribute;
   displaying a first view on the display device during the execution, the first view comprising:
      the context hierarchical data structure;
      the data; and
      the summary of the structure and data of each node in the context hierarchical data structure.

2. The computer-implemented method of claim 1 further comprising:
   determining whether the context hierarchical data structure is correct;
   determining whether dynamic nodes and attributes have been created; and
   determining whether the dynamic nodes and attributes contain data.

3. The computer-implemented method of claim 1 wherein the context hierarchical data structure represents a controller that interprets and monitors data input by a user that causes a model or a view to change if necessary.

4. The computer-implemented method of claim 3 wherein the model represents an application object of the business software application.

5. The computer-implemented method of claim 3 wherein the view comprises a set of user interface (UI) elements that can display application data and receive input, the UI elements bound to the context hierarchical data structure.

6. The computer-implemented method of claim 1 wherein the first view comprises features selected from the group consisting of horizontal reading, vertical reading, limited reading and on and off options.

7. The computer-implemented method of claim 3 wherein the view and the controller form a user interface (UI).

8. A computer program product for displaying information on a computer display device tangibly embodied on a machine readable storage device, having a plurality of instructions stored therein, which, when executed by a computer processor, cause the computer processor to perform operations comprising:
   loading data into a context hierarchical data structure in memory during an execution of a business software application, the context hierarchical data structure comprising an arrangement of nodes and attributes, wherein the data are generated during execution and debugging of software;
   retrieving at least a portion of the data from the context hierarchical data structure;
   generating a summary of the structure and data of each node in the context hierarchical data structure wherein at least one of the nodes is a model node, the model node including a reference to an external object storing data, the summary including:
   for each node in the context hierarchical data structure, a number of attributes associated with the node, a number of elements associated with the node, and a number of sub nodes associated with the node;
   for each element in the context hierarchical data structure, a list of attributes associated with the element; and
   for each attribute in the context hierarchical data structure, a value of the attribute;
   displaying a first view on the display device during the execution, the first view comprising:
   the context hierarchical data structure;
   the data; and
   the summary of the structure and data of each node in the context hierarchical data structure.

9. The computer program product of claim 8 wherein the operations further comprise:
   determining whether the context hierarchical data structure is correct;
   determining whether dynamic nodes and attributes have been created; and
   determining whether the dynamic nodes and attributes contain data.

10. The computer program product of claim 8 wherein the context hierarchical data structure represents a controller that interprets and monitors data input by a user that causes a model or a view to change if necessary.

11. The computer program product of claim 10 wherein the model represents an application object of the business software application.

12. The computer program product of claim 10 wherein the view comprises a set of user interface (UI) elements that can display application data and receive input, the UI elements bound to the context hierarchical data structure.

13. The computer program product of claim 8 wherein the first view comprises features selected from the group consisting of horizontal reading, vertical reading, limited reading and on and off options.

14. The computer program product claim 10 wherein the view and the controller form a user interface (UI).

15. A computer program product tangibly embodied on a machine readable storage device, having a plurality of instructions stored thereon, which, when executed by a computer processor, cause the computer processor to perform operations comprising:
   loading data into a context hierarchical data structure in memory during an execution of a business software application, the context hierarchical data structure comprising an arrangement of nodes and attributes, wherein the data represents a controller that interprets and monitors data input by a user that causes a model or a view to change, the model representing an application object of a business software application, the view comprising a set of user interface (UI) elements that can display application data and receive input, the UI elements bound to the context hierarchical data structure;
   retrieving at least a portion of the data from the context hierarchical data structure;
   generating a summary of the structure and data of the context hierarchical data structure wherein at least one of the nodes is a model node, the model including a reference to an external object storing data, the summary including:
   for each node in the context hierarchical data structure, a number of attributes associated with the node, a number of elements associated with the node, and a number of sub nodes associated with the node;
   for each element in the context hierarchical data structure, a list of attributes associated with the element; and
   for each attribute in the context hierarchical data structure, a value of the attribute;
   displaying a graphical user interface (GUI), wherein the graphical user interface includes a first view comprising:
   the context hierarchical data structure;
   the data; and
   the summary of the structure and data of each node in the context hierarchical data structure;
   wherein the application data are generated during execution and debugging of software.

16. The computer program product of claim 15 wherein the GUI further comprises features selected from the group consisting of horizontal reading pane, vertical reading pane, limited reading pane and on/off options pane.

17. The computer-implemented method of claim 1 wherein the application data are generated during execution and debugging of software created in a Web Dynpro design environment and executed in a Web Dynpro run time environment.

18. The computer program product of claim 8 wherein the application data are generated during execution and debugging of software created in a Web Dynpro design environment and executed in a Web Dynpro run time environment.

19. The computer program product of claim 15 wherein the application data are generated during execution and debugging of software created in a Web Dynpro design environment and executed in a Web Dynpro run time environment.

20. The computer-implemented method of claim 1 wherein at least one given node of the nodes has a reference to the given node's metadata as defined at design time.

* * * * *